(12) United States Patent
Lima (10) Patent No.: US 11,131,907 B2
(45) Date of Patent: Sep. 28, 2021

(54) DEVICE SWEEPER

(71) Applicant: Lintec of America, Inc., Richardson, TX (US)

(72) Inventor: Marcio Dias Lima, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 84 days.

(21) Appl. No.: 16/721,071

(22) Filed: Dec. 19, 2019

(65) Prior Publication Data

US 2020/0201148 A1    Jun. 25, 2020

Related U.S. Application Data

(60) Provisional application No. 62/782,196, filed on Dec. 19, 2018.

(51) Int. Cl.
| | |
|---|---|
| *G03B 17/56* | (2021.01) |
| *F16M 11/20* | (2006.01) |
| *F16M 13/02* | (2006.01) |
| *F16M 11/18* | (2006.01) |
| *F16M 11/04* | (2006.01) |
| *F16M 11/12* | (2006.01) |
| *F16M 11/10* | (2006.01) |

(52) U.S. Cl.
CPC .......... *G03B 17/561* (2013.01); *F16M 11/04* (2013.01); *F16M 11/10* (2013.01); *F16M 11/12* (2013.01); *F16M 11/18* (2013.01); *F16M 11/2021* (2013.01); *F16M 13/022* (2013.01)

(58) Field of Classification Search
CPC ........ G03B 17/56; F16M 11/04; F16M 11/12; F16M 11/10; F16M 11/18

USPC ........................................................ 396/428
See application file for complete search history.

(56) References Cited

U.S. PATENT DOCUMENTS

| | | | | |
|---|---|---|---|---|
| 9,662,197 | B2 * | 5/2017 | Yun | B25J 9/1075 |
| 10,288,089 | B2 * | 5/2019 | Asai | B25J 9/1075 |
| 10,898,404 | B2 * | 1/2021 | Lim | A61H 3/00 |
| 2002/0106956 | A1 * | 8/2002 | Howland | B32B 5/26 |
| | | | | 442/208 |

(Continued)

OTHER PUBLICATIONS

Jiefeng Sun et al., Soft Robots Driven by Twisted-and-Coiled Actuators, Adaptive Robotics Lab Colorado State University, https://www.youtube.com/watch?v=i8mjU3i3QWE, Jun. 29, 2020 (Year: 2020).*

(Continued)

*Primary Examiner* — Clayton E. LaBalle
*Assistant Examiner* — Kevin C Butler
(74) *Attorney, Agent, or Firm* — Greenblum & Bernstein, P.L.C.

(57) ABSTRACT

Apparatuses and methods for manufacturing an apparatus for supplying a sweeping motion for a device such as a camera are disclosed. The apparatus includes a stationary rod and a rotational rod arranged parallel to the stationary rod at a fixed distance from the stationary rod. The apparatus includes a device disposed on the rotational rod and a plurality of linear artificial muscle actuators arranged between the stationary and rotational rods and perpendicular to central axes of the stationary and rotational rods. Actuation of a top-portion of the plurality of linear artificial muscle actuators rotates the rotational rod in a first direction, and an actuation of a bottom-portion of the plurality of linear artificial muscle actuators rotates the rotational rod in a second direction opposite to the first direction.

20 Claims, 4 Drawing Sheets

(56) References Cited

U.S. PATENT DOCUMENTS

| | | | |
|---|---|---|---|
| 2005/0269906 A1* | 12/2005 | Allan | H01L 41/33 |
| | | | 310/332 |
| 2006/0076540 A1* | 4/2006 | Zama | C08G 61/124 |
| | | | 252/500 |
| 2009/0085444 A1* | 4/2009 | Alvarez Icaza Rivera | |
| | | | H01L 41/1132 |
| | | | 310/365 |
| 2015/0219078 A1* | 8/2015 | Li | H02N 10/00 |
| | | | 310/306 |
| 2018/0291535 A1* | 10/2018 | Ridley | D02G 3/36 |
| 2020/0201148 A1* | 6/2020 | Lima | G03B 17/561 |

OTHER PUBLICATIONS

Yong-Lae Park, Bio-Inspired Soft Robotics : New Ways of Sensing and Actuation, Carnegie Mellon University, https://www.youtube.com/watch?v=e8W9Nwu-Sbc , Sep. 19, 2014 (Year: 2014).*

Chunbing Wu et al., Position and Force Control of a Twisted and Coiled Polymeric Actuator, IEEE, Jul. 24, 2020, 9 pages (Year: 2020).*

Ali Abbas, Modeling of Twisted and Coiled Artificail Muscle for Actuation and Self-Sensing, Colorado State Univerity, 2018, 60 pages (Year: 2018).*

Chunbling Wu, A Modeling of Twisted and Coiled Polymer Artificial Muscles Based on Elastic Rod Theory, MDPI, Apr. 2, 2020, 14 pages (Year: 2020).*

Qianxi Yang et al., A Top-down multi-scale modeling for actuation response of polymeric artificial muscles, Journal of the Mechanics and Physics of Solids, Apr. 6, 2016, 23 pages (Year: 2016).*

* cited by examiner

DEVICE SWEEPER

CROSS-REFERENCE TO RELATED APPLICATIONS

This Application claims priority, pursuant to 35 U.S.C. § 119(e) to U.S. Provisional Application 62/782,196 filed on Dec. 19, 2018. The contents of which are hereby incorporated by reference in its entirety.

BACKGROUND OF INVENTION

Artificial actuator devices based on elastic polymeric fibers have a wide range of applications. Devices comprising twisted and/or coiled actuators have the advantage of low cost, high production volume, and design simplicity. Conventional motors that provide rotational device movement may be complicated, expensive, bulky, and noisy, particularly if they are manufactured for harsh environments, for example in a vehicle. Artificial actuator devices may provide for a simpler, smaller, cheaper, and quieter alternative to conventional motors.

SUMMARY OF INVENTION

In one aspect, embodiments disclosed herein relate to an apparatus that includes a base with a device disposed on the base. The apparatus includes a first linear artificial muscle actuator with a first end disposed at a first location on the base and a second end disposed on a first foundation and a second linear artificial muscle actuator with a first end disposed on a second location on the base and a second end disposed on a second foundation. In accordance with embodiments disclosed herein, the actuation of the first linear artificial muscle actuator tilts the base in a first direction, and an actuation of the second linear artificial muscle actuator tilts the base in a second direction opposite to the first direction.

In another aspect, embodiments disclosed herein relate to an apparatus that includes a stationary rod and a rotational rod arranged parallel to the stationary rod at a fixed distance from the stationary rod. The apparatus includes a device disposed on the rotational rod and a plurality of linear artificial muscle actuators arranged between the stationary and rotational rods and perpendicular to central axes of the stationary and rotational rods. In the apparatus, a first end of each of the plurality of linear artificial muscle actuators is secured to a top-side of the stationary rod. The plurality of linear artificial muscle actuators extend across the fixed distance, curl around the rotational rod, and extend back across the fixed distance. A second end of the each of the plurality of linear artificial muscle actuators is secured to a bottom-side of the stationary rod. In accordance with embodiments disclosed herein, actuation of a top-portion of the plurality of linear artificial muscle actuators rotates the rotational rod in a first direction, and an actuation of a bottom-portion of the plurality of linear artificial muscle actuators rotates the rotational rod in a second direction opposite to the first direction.

In another aspect, embodiments disclosed herein relate to a method of manufacturing an apparatus that includes disposing a device on a base, disposing a first end of a first linear artificial muscle actuator at a first location of the base and disposing a second end of the first linear artificial muscle actuator on a first foundation. The method also includes disposing a first end of a second linear artificial muscle actuator at a second location of the base and disposing a second end of the second linear artificial muscle actuator on a second foundation. In accordance with embodiments disclosed herein, an actuation of the first linear artificial muscle actuator tilts the base in a first direction, and an actuation of the second linear artificial muscle actuator tilts the base in a second direction opposite to the first direction.

In another aspect, embodiments disclosed herein relate to a method of manufacturing an apparatus that includes arranging a stationary rod parallel to a rotational rod at a fixed distance from each other and disposing a device on the rotational rod. The first end of a linear artificial muscle actuator is secured to a top-side of the stationary rod. The linear artificial muscle actuator is wrapped across the fixed distance, around the rotational rod, back across the fixed distance, and around the stationary rod one or more times, and a second end of the linear artificial muscle actuator is secured to the stationary rod. The method includes applying a conducting material to portions of the linear artificial muscle actuator contacting the top-side and a bottom-side of the stationary rod and removing portions of the linear artificial muscle actuator contacting the stationary rod, between the top-side and the bottom-side of the stationary rod, and on a side of the stationary rod opposite to the rotational rod. In accordance with embodiments disclosed herein, an actuation of a top-portion of the plurality of linear artificial muscle actuators rotates the rotational rod in a first direction, and an actuation of a bottom-portion of the plurality of artificial muscle actuators rotates the rotational rod in a second direction opposite to the first direction.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

It is to be understood that the singular forms "a," "an," and "the" include plural referents unless the context clearly dictates otherwise. Thus, for example, reference to "a horizontal beam" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect of the characteristic was intended to provide.

In general, embodiments of the invention relate to an apparatus and method of manufacturing an apparatus to provide a sweeping motion for a device. For example, embodiments disclosed herein may provide for an apparatus for pointing, or to provide a sweeping motion, for a device such as camera, sensor, light source, or the like. Embodiments disclosed herein may provide for simple, quiet, low-cost, and robust alternative to conventional motors.

Embodiments disclosed herein utilize polymer and/or Carbon Nanotube artificial muscle actuators that includes twist-spun nanofiber yarns and twisted polymer fibers that generate torsional and/or tensile actuation when powered electrically, photonically, thermally, chemically, by absorption, or by other means.

One or more embodiments of the invention may include linear artificial muscle actuators. One or more embodiments of the invention may include coiled yarns or polymer fibers that may be either neat or include a guest. In other embodiments, other types of artificial muscle actuators may be used.

The artificial muscle actuators in one or more embodiments above are disclosed in U.S. Provisional Application No. 62/634,124, entitled "MUSCLE TENTACLE," filed on Feb. 22, 2018. The contents of which are hereby incorporated by reference in its entirety.

One or more embodiments include an apparatus that has a base (e.g., a rod, lever, etc.) for mounting a device. Embodiments of the apparatus include a first artificial muscle actuator (e.g., a linear artificial muscle actuator) with a first end disposed at a first location of the base (e.g., one end of the base) and a second end attached to a first foundation (e.g., a mount that allows movements of the base). The apparatus includes a second artificial muscle actuator with an end attached at a second location of the base (e.g., on another end or the same end of the base) and similarly attached to a second foundation.

In one or more embodiments, the first and second foundation may be part of the same solid object. Alternatively, in one or more embodiments, the first and second foundations may be different objects.

Figure 1:
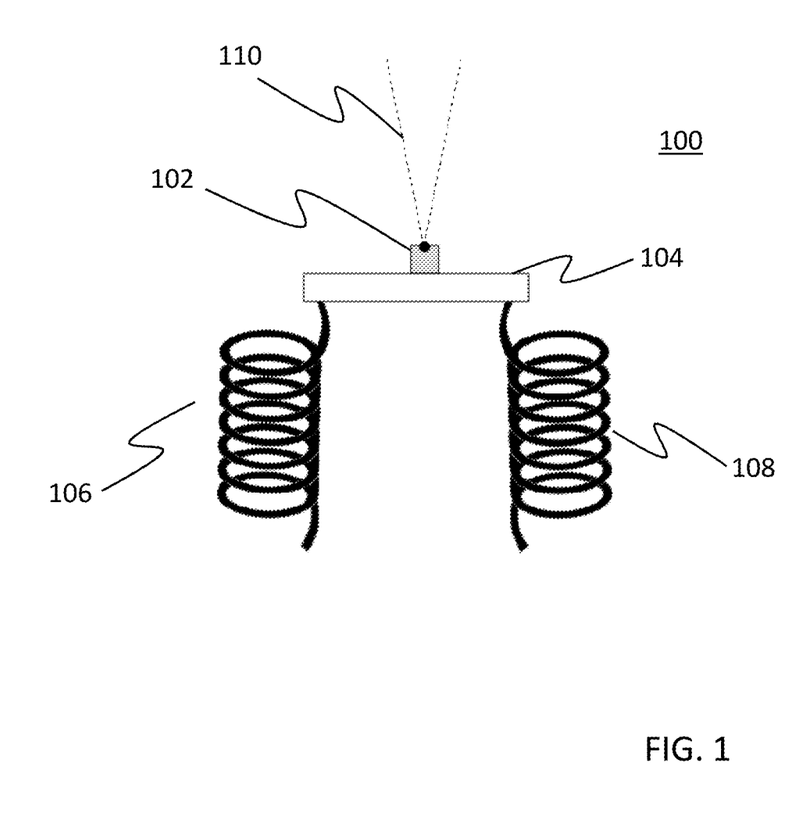
FIG. 1 is a schematic of a device sweeper apparatus in accordance with one or more embodiments disclosed herein.

FIG. 1 shows a schematic of a device sweeper in accordance with embodiments disclosed herein. In the embodiments described by FIG. 1, the device sweeper 100 includes a device 102 disposed on a base 104. On the opposite side of the base from the device, a first 106 and second 108 artificial muscle actuator is attached to the base 104. The other end of the first linear artificial muscle fiber actuator 106 is attached to a first foundation (not shown). Similarly, the other end of the second linear artificial muscle fiber actuator 108 is attached to a second foundation (not shown).

In the examples of FIG. 1, only two artificial muscle actuators are shown; however, embodiments of the invention are not limited as such. One of ordinary skill in the art will appreciate that more than two artificial muscle actuators may be used.

By actuating the first linear artificial muscle fiber actuator 106, the first linear artificial muscle fiber actuator 106 becomes shorter, and the base 104 may be tilted in a direction towards the first linear artificial muscle fiber actuator 106. By actuating the second linear artificial muscle fiber actuator 108, the base 104 may be tilted in the direction of the second linear artificial muscle fiber actuator 108, opposite from the first artificial muscle fiber actuator 106. Accordingly, the device view 110 may be directed or swept in a manner determined by the actuation of the linear artificial muscle fiber actuators.

Figure 2:
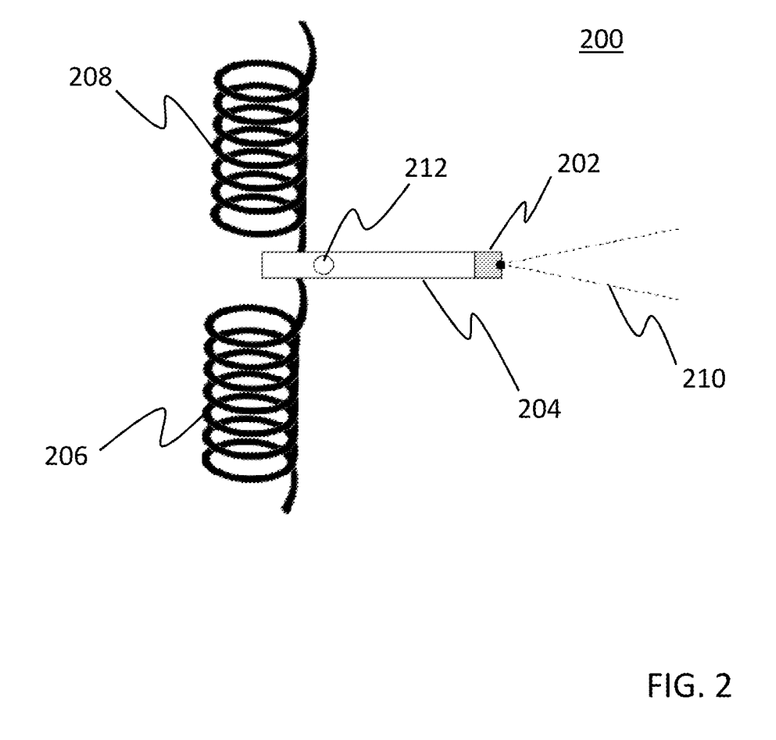
FIG. 2 is a schematic of a device sweeper apparatus in accordance with one or more embodiments disclosed herein.

FIG. 2 is a schematic of another device sweeper in accordance with embodiments disclosed herein. In FIG. 2, the device sweeper 200 includes a device 202 mounted on a base 204. The embodiments of FIG. 2 include a pin 212 disposed in the base 204 that acts as a pivot for the motion of the base 204. The pin 212 is located between the device 202 and the artificial muscle fiber actuator that control the motion of the device sweeper 200. In FIG. 2, one end of a first linear artificial muscle fiber actuator 206 is attached on one side of the base 204 and the other end of the first linear artificial muscle fiber actuator 206 is attached to a first foundation (not shown). One end of a second linear artificial muscle fiber actuator 208 is attached on an opposite side of the base 204, while the other end of the second linear artificial muscle fiber actuator 208 is attached to a second foundation (not shown). In these embodiments, the first 206 and second 208 linear artificial muscle fiber actuators may be aligned linearly.

In the embodiments of FIG. 2, the first 206 and second 208 linear artificial muscle fiber actuators are arranged such that actuation of the first linear artificial muscle fiber actuator 206 causes the base 204 to rotate about the pin 212. Actuation of the second linear artificial muscle fiber actuator 208 causes the base 204 to pivot about the pin 212 in the opposite direction. In accordance with embodiments disclosed herein, the device view 210 may be controlled or swept by controlling the actuation of the first the first 206 and second 208 linear artificial muscle fiber actuators.

Figure 3:
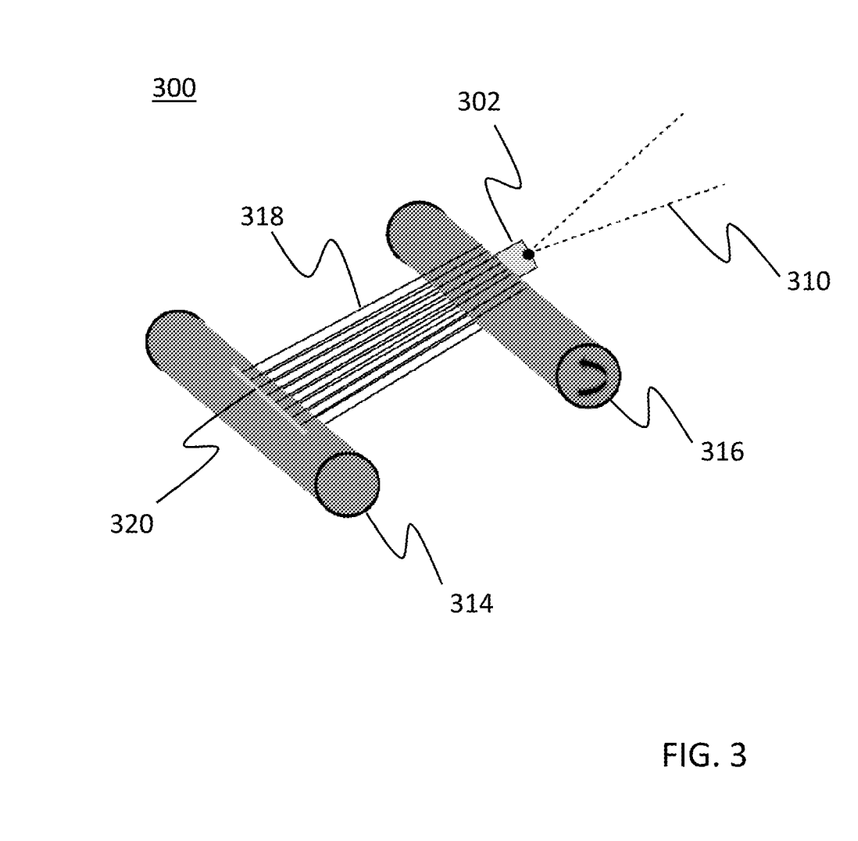
FIG. 3 is a schematic of a device sweeper apparatus in accordance with one or more embodiments disclosed herein.

FIG. 3 is a schematic of a device sweeper in accordance with embodiments disclosed herein. Embodiments of the device sweeper 300 of FIG. 3 include a stationary rod 314 arranged parallel to a rotational rod 316 at a fixed distance. The rotational rod 316 is capable of rotating while maintaining the fixed distance from the stationary rod 314. The device 302 is disposed on the rotational rod 316 such that the device field of view 310 is controlled or swept by the rotation of the rotational rod 316.

A plurality of linear artificial muscle actuators 318 are arranged between the stationary 314 and rotational rods 316 such that the linear artificial muscle actuators 318 are perpendicular to central axes of the stationary 314 and rotational rods 316. A first end of the plurality of linear artificial muscle actuators 318 is secured to a top side of the of the stationary rod 314, extend across the fixed distance, curl around the rotational rod, extend back across the fixed distance, and the other end of the plurality of linear artificial muscle actuators 318 is secured to a bottom side of the of the stationary rod 314.

In accordance with embodiments disclosed herein, the plurality of linear artificial muscle actuators 318 are secured on the top and bottom side of the stationary rod at a top side connection 320 using a conducting material such that the ends of the plurality of linear artificial muscle actuators 318 are electrically connected and that a voltage may be applied to the plurality of linear artificial muscle actuators 318 via the conducting material 320. For example, the conducting material may include a conducting adhesive or silver paste. In the embodiments disclosed herein, a voltage may be applied to the plurality of linear artificial muscle actuators 318 at one or both of the top side connection 320 and bottom side connection (not shown). Here, the top and bottom side of the stationary rod is arranged in line that is perpendicular to the axis of the rod and the direction of the fixed distance.

The rotational rod 316 may be comprised of a conducting material or may include a full or partial coating of a conducting material. In accordance with one or more embodiments disclosed herein, a voltage applied across the top side connection 320 and the conducting portions of the rotational rod 316 causes the plurality of linear artificial muscle actuators 318 to actuate and rotate the rotational rod 316 resulting in control of the device field of view 310. Similarly, a voltage applied across the bottom side connection and the conducting portions of the rotational rod 316 causes the plurality of linear artificial muscle actuators 318 to actuate and rotate the rotational rod 316 in the opposite direction.

In one or more embodiments disclosed herein, a voltage source may be connected to the top side connection 320 and the bottom side connection, while the rotational rod is electrically grounded. In these embodiments, it may be considered that the device sweeper 300 includes two electrically distinct segments that may be actuated separately. For example, the plurality of linear artificial muscle actuators 318 connected to the top side to the stationary rod 314 to the electrically grounded rotational rod 316 may be considered one segment, while the plurality of linear artificial muscle actuators 318 connected to the bottom side of the stationary rod 314 to the electrically grounded rotational rod 316 may be considered the second electrically distinct segment.

In the enclosed embodiments, the fixed distance between the stationary rod 314 and the rotational rod 316 is limited in that the distance must be greater than the distance at which arching would occur with the applied voltage. One of ordinary skill in the art will appreciate that the applied voltage necessary to control the device's field of view is determined by the number of artificial muscle actuators, as well as the fixed distance.

Figure 4:
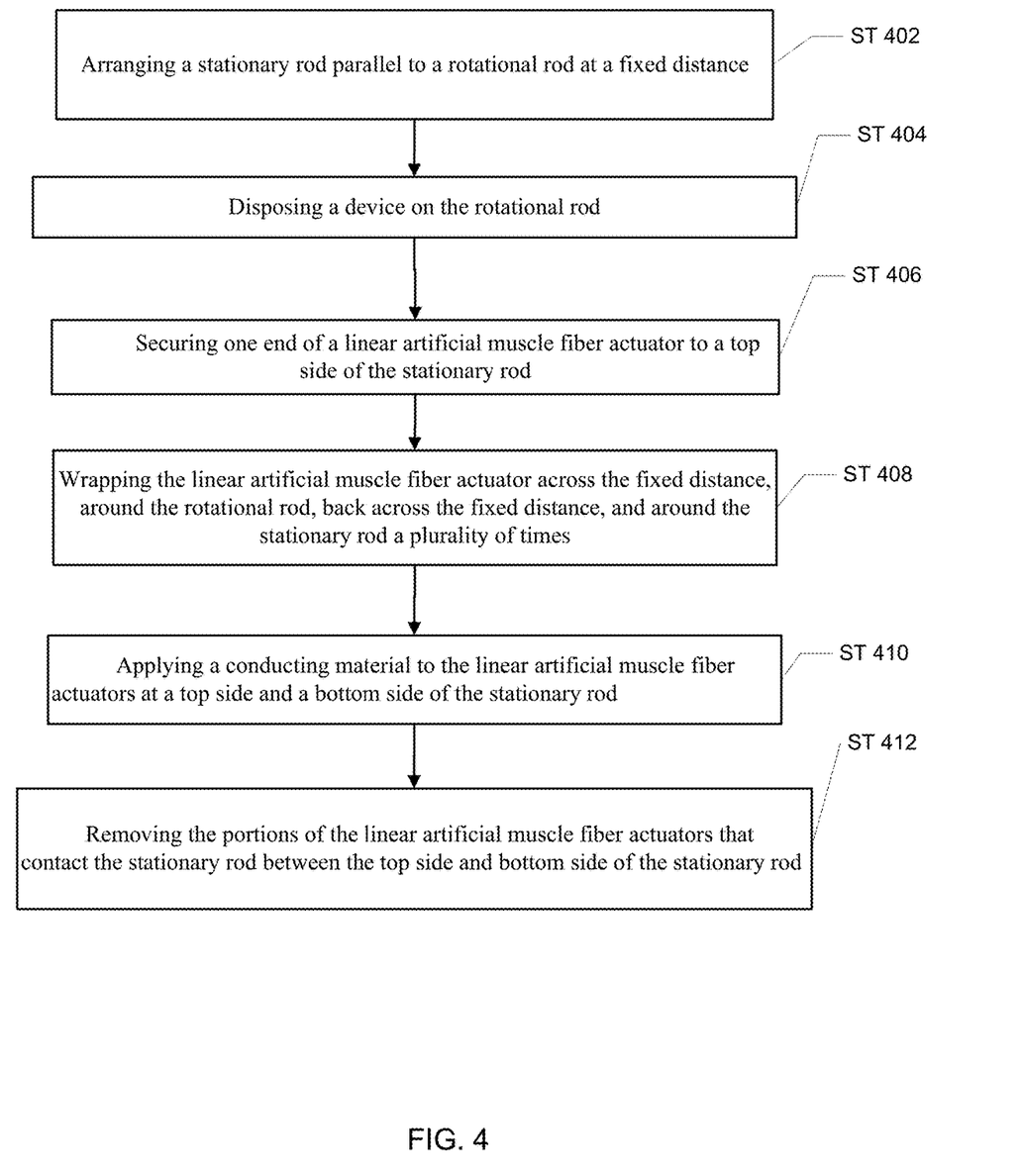
FIG. 4 is flow chart of a method in accordance with one or more embodiments disclosed herein.

FIG. 4 is a flow chart in accordance with one or more embodiments disclosed herein. In ST 402, a stationary rod and a rotational rod are arranged parallel to each other at a fixed distance apart. In ST 404, a device is disposed on the rotational rod. In ST 406, one end of a linear artificial muscle actuator is secured to a top side of the stationary rod. The linear artificial muscle actuator is then wrapped around the rotational and stationary rods multiple times in ST 408. In one or more embodiments, the wrapping is controlled such that the linear artificial muscle fiber actuator does not overlap itself; however, embodiments are not limited as such. By wrapping the linear artificial muscle fiber actuator without overlapping, the surface area may be maximized to facilitate cooling of the artificial muscle fibers after actuation. One of ordinary skill in the art will appreciate that the greater the surface area of the wrapped artificial muscle fibers, the faster the cooling rate.

A conductive material is applied to the wrapped linear artificial muscle actuator at a top side and bottom side of the stationary rod in ST 410. Thus, at each of the top and bottom side of the stationary rod, the conducting material electrically connects the wrapped linear artificial muscle actuators and secures the wrapped linear artificial muscle actuators to the stationary rod.

The portions of the linear artificial muscle actuator that contact the stationary rod between the top and bottom side of the stationary rod are removed. That is, the portions of the wrapped linear artificial muscle actuator on the other side from the rotational rod between the top and bottom side of the stationary rod are removed. A voltage source may then be connected to the conducting material at the top side connection and the bottom side connection, while the rotational rod may be connected to ground.

In accordance with embodiments disclosed herein, to control the field of view of the device, a voltage applied to the top side connection of the stationary rod causes the linear artificial muscle actuator to contract and rotate the rotational rod. Disconnected the voltage, and applying a voltage to the bottom side connection of the stationary rod cause the rotational rod to rotate in the opposite direction.

Embodiments disclosed herein may advantageously provide for simple, quiet, low-cost, and robust alternative to controlling the directionality of a device, such as a camera or sensor, when compared to conventional motors.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An apparatus comprising:
   a base;
   a device disposed on the base;
   a first linear artificial muscle actuator with a first end disposed at a first location on the base and a second end disposed on a first foundation;
   a second linear artificial muscle actuator with a first end disposed on a second location on the base and a second end disposed on a second foundation,
   wherein an actuation of the first linear artificial muscle actuator tilts the base in a first direction, and an actuation of the second linear artificial muscle actuator tilts the base in a second direction opposite to the first direction.

2. The apparatus of claim 1, wherein the first and second locations are on the same side of the base and an opposite side of the base with the device.

3. The apparatus of claim 1, further comprising:
   a pin disposed in the base, wherein the pin allows rotational movements of the base around the pin, and
   wherein the pin is located between the first and second locations and the device.

4. The apparatus of claim 1, further comprising:
   one or more additional linear artificial muscle actuators disposed on the base,
   wherein an actuation of the first, second, and additional linear artificial muscle actuators controls angles of the tilts of the base relative to the first and second foundations.

5. The apparatus of claim 1, wherein the artificial muscle actuators are polymer based.

6. An apparatus comprising:
   a stationary rod;
   a rotational rod arranged parallel to the stationary rod at a fixed distance from the stationary rod;
   an device disposed on the rotational rod;
   a plurality of linear artificial muscle actuators arranged between the stationary and rotational rods and perpendicular to central axes of the stationary and rotational rods,
   wherein
      a first end of each of the plurality of linear artificial muscle actuators is secured to a top-side of the stationary rod,
      the plurality of linear artificial muscle actuators extend across the fixed distance, curl around the rotational rod, and extend back across the fixed distance and a second end of the each of the plurality of linear artificial muscle actuators is secured to a bottom-side of the stationary rod;
      an actuation of a top-portion of the plurality of linear artificial muscle actuators rotates the rotational rod in a first direction, and an actuation of a bottom-portion of the plurality of linear artificial muscle actuators rotates the rotational rod in a second direction opposite to the first direction.

7. The apparatus of claim 6, wherein
the rotational rod has a conductive surface and is electrically grounded, and
the actuations are caused by an applied voltage to the top-portion or bottom portion of the plurality of linear artificial muscle actuators.

8. The apparatus of claim 6, wherein the rotational rod is made of an insulating material with a conductive coating such that the conductive coating contacts the linear artificial muscle actuators.

9. The apparatus of claim 6, wherein the artificial muscle actuators are polymer based.

10. The apparatus of claim 6, wherein the device is a camera.

11. A method of manufacturing an apparatus, the method comprising:
disposing a device on a base;
disposing a first end of a first linear artificial muscle actuator at a first location of the base;
disposing a second end of the first linear artificial muscle actuator on a first foundation;
disposing a first end of a second linear artificial muscle actuator at a second location of the base;
disposing a second end of the second linear artificial muscle actuator on a second foundation,
wherein an actuation of the first linear artificial muscle actuator tilts the base in a first direction, and an actuation of the second linear artificial muscle actuator tilts the base in a second direction opposite to the first direction.

12. The method of claim 11, wherein the first and second locations are on the same side of the base and an opposite side of the base with the device.

13. The method of claim 11, further comprising:
disposing a pin in the base, wherein the pin allows rotational movements of the base around the pin, and wherein the pin is located between the first and second locations and the device.

14. The method of claim 11, further comprising:
disposing first ends of one or more additional linear artificial muscle actuators to the base,
wherein actuation of the first, second, and additional linear artificial muscle actuators controls angles of the tilts of the base relative to the first and second foundations.

15. A method of manufacturing an apparatus, the method comprising:
arranging a stationary rod parallel to a rotational rod at a fixed distance from each other;
disposing a device on the rotational rod;
securing a first end of a linear artificial muscle actuator to a top-side of the stationary rod;
wrapping the linear artificial muscle actuator across the fixed distance, around the rotational rod, back across the fixed distance, and around the stationary rod one or more times;
securing a second end of the linear artificial muscle actuator to the stationary rod;
applying a conducting material to portions of the linear artificial muscle actuator contacting the top-side and a bottom-side of the stationary rod;
removing portions of the linear artificial muscle actuator contacting the stationary rod, between the top-side and the bottom-side of the stationary rod, and on a side of the stationary rod opposite to the rotational rod;
wherein an actuation of a top-portion of the plurality of linear artificial muscle actuators rotates the rotational rod in a first direction, and an actuation of a bottom-portion of the plurality of artificial muscle actuators rotates the rotational rod in a second direction opposite to the first direction.

16. The method of claim 15, wherein the conductive surface of the rotational rod is electrically grounded and the actuations are caused by an applied voltage to the top-portion or bottom-portion of the plurality of linear artificial muscle actuators via the conducting material.

17. The method of claim 15, wherein the conducting material comprises silver paste.

18. The method of claim 15, wherein the rotational rod is made of an insulating material with a conductive coating contacting the artificial muscle fiber actuators.

19. The method of claim 15, wherein the artificial muscle actuators are polymer based.

20. The method of claim 15, wherein the device is a camera.

* * * * *

UNITED STATES PATENT AND TRADEMARK OFFICE
CERTIFICATE OF CORRECTION

PATENT NO. : 11,131,907 B2
APPLICATION NO. : 16/721071
DATED : September 28, 2021
INVENTOR(S) : Lima It is certified that error appears in the above-identified patent and that said Letters Patent is hereby corrected as shown below:

On the Title Page

Under item (56), Other Publications, page 2, Column 1, Line 7, please change "Artificail" to -- Artificial --
Under item (56), Other Publications, page 2, Column 1, Line 8, please change "Univerity" to -- University --

In the Claims

Column 6, Line 50 (Claim 6, Line 5) please change "an device" to -- a device --
Column 7, Line 8 (Claim 7, Line 5) please change "bottom portion" to -- bottom-portion --

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*